Figure 1:
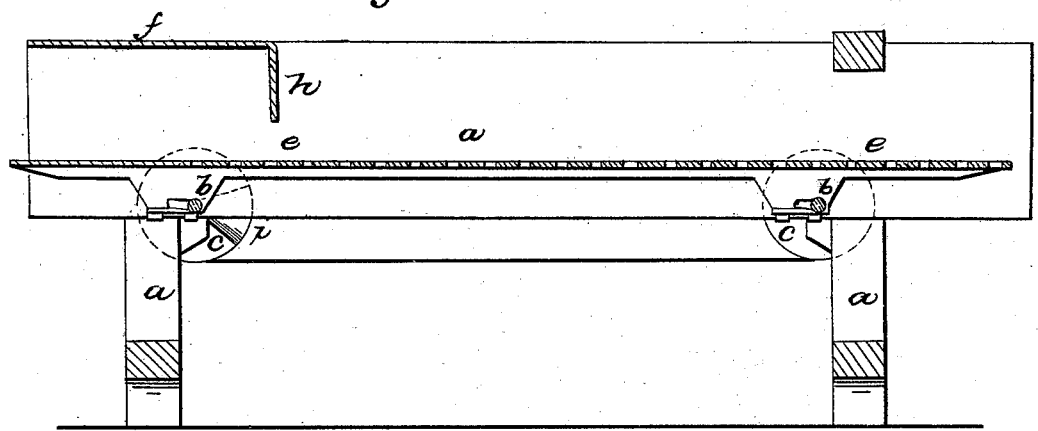
Figure 2:
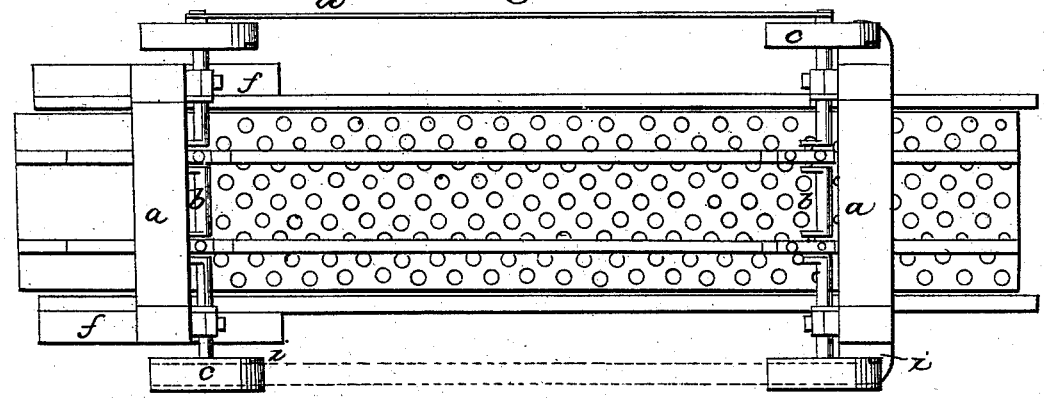

W. PIERPOINT.
Grain Separator.

No. 7,349. Patented May 7, 1850.

UNITED STATES PATENT OFFICE.

WILLIAM PIERPOINT, OF SALEM, NEW JERSEY.

STRAW-CARRIER.

Specification of Letters Patent No. 7,349, dated May 7, 1850.

*To all whom it may concern:*

Be it known that I, WILLIAM PIERPOINT, of Salem, in the county of Salem, and State of New Jersey, have invented a new and useful Improvement in Grain and Seed Separators and Straw-Carriers, and that the following is a full, clear, and exact description of the principle or character which distinguishes it from all other things before known and of the usual manner of making, modifying, and using the same, reference being had to the accompanying drawing, which forms a part of this specification.

My invention consists in the peculiar construction of a seed separator and straw carrier, and its adaptation to a threshing machine, by which the straw is removed and the grain separated from it in a more effectual manner than by any other plan hitherto in use. The construction is as follows: I form a suitable frame (*a*), the width of the threshing machine, and of any desired length; this may be horizontal, as in the drawing, or one end may be elevated; across each end of the frame are hung crank shafts (*b*), on each of which are two cranks, one near each journal; these shafts project beyond the frame, and have a pulley (*c*) on each end; the two shafts are connected by a belt, and also by a connecting rod (*d*) so as to turn together; on the cranks of these shafts, an apron or separator (*e*) is supported, so as to partake the motion of the cranks as they revolve, throwing forward, as they rise, and receding as they sink, which has the effect to carry forward the straw and sift all the seed from it, by means of the shaking motion given thereto, there being a sufficient number of holes through the separator to discharge all seed shaken down. At the end of the apparatus next the thresher, there should be a cover (*f*) over the shaker, for the straw from the threshing machine to pass out under a small door or guard (*h*) being hinged to its outer end, or that farthest from the thresher, which hangs down loosely toward the separator, this prevents bunches of straw from the threshing machine being thrown so far over as not to be acted on by the separator, while at the same time it rises to deliver the straw freely carried forward by the separator.

To cause the machine to run with a small amount of power, and in fact to render it practical at all, I load the crank shaft with counter balances (*i*) (colored blue in the drawing); these just counterbalance the platform of the separator, so as to require no more power than is expended upon the friction of the parts, and in carrying forward the straw.

Having thus fully described my improved straw carrier and separator, what I claim therein, and for which I desire to secure Letters Patent, is—

An elongated apron or pierced platform, hung upon and worked by cranks connected with and forming a part of the threshing and separating machine, substantially in the manner and for the purposes herein described.

WILLIAM PIERPOINT.

Witnesses:
WM. GREENOUGH,
T. C. DONN.